July 10, 1923.  1,461,131
T. H. MARTEN
METHOD OF PRODUCING VISUAL DEPTH IN PROJECTED PICTURES
Filed Oct. 1, 1921
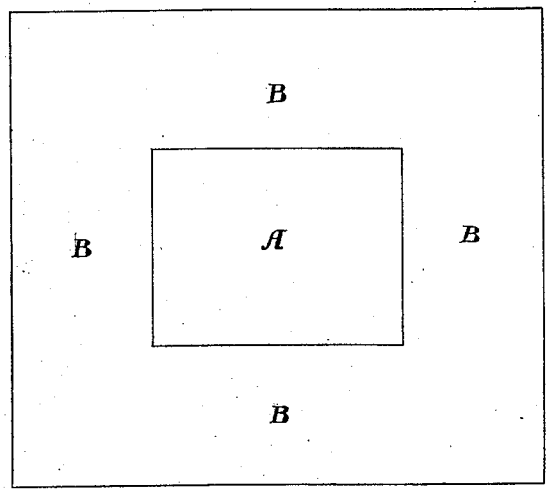
Fig. 1.
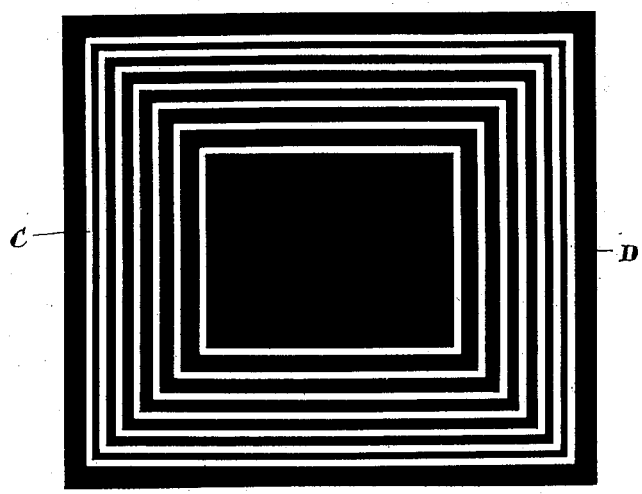
Fig. 2.
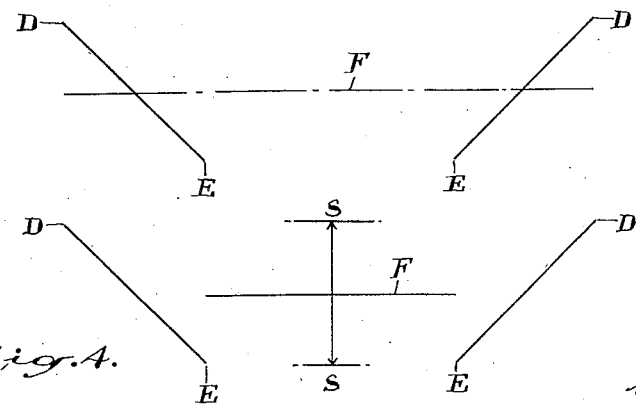
Fig. 3.
Fig. 4.
Inventor.
Thomas Henry Marten Patented July 10, 1923.

1,461,131

UNITED STATES PATENT OFFICE.

THOMAS HENRY MARTEN, OF TORONTO, ONTARIO, CANADA.

METHOD OF PRODUCING VISUAL DEPTH IN PROJECTED PICTURES.

Application filed October 1, 1921. Serial No. 504,545.

*To all whom it may concern:*

Be it known that I, THOMAS HENRY MARTEN, a subject of the King of Great Britain, and resident of the city of Toronto, county of York, Province of Ontario, in the Dominion of Canada, have invented certain new and useful Improvements in a Method of Producing Visual Depth in Projected Pictures, described in the following specification and illustrated in the accompanying drawings, that form part of the same.

The principal objects of the invention are, to produce more attractive and natural appearing pictures by causing a visual physical sensation of depth or distance in the picture.

A further object is to eliminate a certain degree of eye strain, commonly resulting from viewing pictures projected upon a screen.

The principal feature of the invention consists in locating upon a plane surface and about the picture a chromatic effect which will create a flexible focal adjustment in the eye of the observer conforming to the natural tendency of the eye of the observer to automatically adjust itself to the varying conditions of depth or distance represented in the picture, such result being accomplished by utilizing the varying refrangibility as between the colors of the spectrum.

It is very well known to those conversant with the picture producing art that the eye of the observer, after a brief period of first viewing a picture, becomes accustomed to the fact that the visual observation is confined to a flat surface.

The eye in its normal function and under ordinary conditions is constantly changing focus and if conditions surrounding a picture are such as to maintain this normal activity, then the eye will function normally and read into the picture the third dimension of depth.

This is quite noticeable in that when first entering a theatre where a picture is being shown, it distinctly shows the element of depth but after it has been viewed for a short time the eye assumes a fixed focus and the picture assumes a flat appearance which is unnatural and causes eye strain.

The principle of the third dimension in vision is partly based on the fact that we have two eyes and the mental reaction with the optic nerves is such as to judge distance by reason of binocular convergence but such convergence is not the only element or component of general vision which produces the visual physical sensation of the third dimension and in order that a thorough understanding of the present invention be had a statement of visual conditions may be made in the following terms:

First: the psychological reaction to the physiological action of the function of convergence by binocular cooperation to locate the position of the object;

Second: the psychological reaction to the physiological action of the function of focal adjustment of the optic lens to produce a sharp retinal image of the object wherever located.

Third: the purely psychological element of the association of real objects with each other as they are known to be through experience with them in our three dimensional world.

Ordinarily the observer is consciously or sub-consciously experiencing the physical sensation of the change of the angle of convergence and the same is true of the change of the focus of the optic lens. The observer is accustomed to consciously or sub-consciously experience the direct association between the function of convergence and the function of focal adjustment and upon the distance of the observer from the object looked at will depend the magnitude of the angle of convergence and the degree of focal adjustment, both becoming less as the distance is increased but both maintaining true association each with the other which is a normal sensation.

When a picture is projected on to a plane surface at a distance close enough to form a conscious angle of convergence the eye adjusts itself to this condition instantaneously and the sensation produced is that both the angle of convergence and the focal adjustment are held fixed in that no one part of the plane surface requires a change of convergence or focal adjustment as compared with any other part and when the eyes, which nature has furnished as measuring instruments, form a fixed angle of convergence combined with a fixed focus they read only in two dimensions, namely, height and breadth. This suspends the normal activity of the muscular system controlling the optic mechanism of the observer, that is to say, the normal flexing and reflexing of the muscles of the eyes are suspended and the abnormal condition produced is what produces eye strain.

The present invention introduces an element to a picture projected upon a flat screen which overcomes the objectionable conditions by surrounding the picture with visual conditions which will cause the eye to function normally.

When a beam of white light is passed through a prism it is split up into its constituent components and the spectrum shows the relative degree of refraction and between rays of different quality to be greatest between the extreme ends, that is to say, there is the greatest degree of refrangible difference between red and blue-violet.

The human eye contains a lens and the primary function or action of a lens is that of a prism. When red and blue rays are sent separately but at the same time through this lens, toward the retina, the lens does not at the same time bring both to a focus on the retina because the one refracts more acutely than the other and when the focal point of the lens is on the retina for red, the blue, whose angle of refraction is greater, falls short of the retina, and when the curvature of the lens is changed to bring the focal point on the retina for blue, the red, whose angle of refraction is less, falls behind the retina. If therefore, red and blue images be placed upon one plane and at a distance from the observer great enough to form only a very mild angle of convergence, it is found that this angle of convergence is flexible enough to permit of focal adjustment to accommodate the red and blue rays respectively and for the reason that focal adjustment is required as between the two colors, the observer does not interpret the objects as being on the same plane but one will appear in advance of the other, consequently the plane is dissolved and the image assumes three dimensions.

The principle herein enunciated may be carried into effect in various ways. In the accompanying drawings, Figure 1 is a diagram of a flat screen provided with a marginal area surrounding the picture area in which A represents the picture area and B the marginal area. This marginal area is divided with lines and spaces as illustrated in the diagram Figure 2 and these lines and spaces may be of any number and collectively or individually of any size. It is preferable to arrange them with the white lines all of an equal width but spaced closer together as they recede from the central picture area, the black spaces assuming different widths.

The white lines C represented in Figure 2 must be regarded as lines of separated constituents of white light and these are so arranged as to form a natural spectrum ranging from blue or blue-violet at the outer boundary D to red at the inner boundary E, the same arrangement being carried around the four sides.

This chromatic arrangement produces the three dimensional effect upon the eye, that is to say, the extreme ends of the spectrum or color range will appear to be on different planes, the outer blue boundary appearing farther away than the red inner boundary, the sides appearing to converge toward the observer as indicated in the diagram Figure 3. In this diagram the dotted line F represents the actual plane surface as it exists and the lines D, E the positions the border surfaces assume visually.

The picture is projected upon the picture area A of Figure 1 but to the observer it appears that he is looking through an aperture indicated by the boundary E surrounding the picture area A and inwardly beyond this aperture the picture appears as illustrated in the diagram Figure 4, consequently the picture is not definitely located at any particular point in the focal depth between the extreme depth of the border D, E, therefore the focal action of the eye will assume the full range between the points S—S illustrated in the diagram in Figure 4 and the consequence of this focal adjustment is that the observer reads a natural depth in the picture and the figures therein stand out clearly with a third dimension.

This optical illusion may be accentuated by introducing into the picture area A a tone of blue, which is preferably strongest at the border of said area. This tone which at its densest part corresponds with the outer color of the border B has the effect of drawing the picture back from the aperture defined by the red border D.

I have described herein the use of all the separated elements of the spectrum but this is not necessary in order to accomplish the desired result as I find that excellent results can be obtained by the use of selected elements having a marked difference in refrangibility, such as the extreme blue and red. There are blendings of these colors which may be utilized intermediately between the inner and outer boundaries or the colors may be subdued in various ways and in fact only a blue outer boundary D with a red inner boundary and no color between will produce the desired effect.

I have described certain combinations or arrangements of colors but it must be understood that I may vary the elements used or vary their arrangement in any manner without departing from the spirit of this invention which is to produce a natural focal activity of the eye by the use of separated light elements surrounding a picture on a screen.

Another and important result achieved in the introduction of a chromatic border to a picture is that the color of the border has a direct influence upon the picture area and effects the absorption of like colors of the spectrum contained in the white light of the picture leaving an effect of the opposite color tint.

What I claim as my invention is:

1. A method of producing visual depth in projected pictures, consisting in surrounding the picture area with an element of light of different refrangibility from the light of the picture to create a condition of differing focal adjustment of the eye of the observer.

2. A method of producing visual depth in projected pictures, consisting in placing around the picture area a border of light, the elements of which are arranged with a substantial degree of refrangible difference between the inner and the outer element to produce operation of the ocular muscles.

3. A method of producing visual depth in projected pictures, consisting in surrounding the picture area with a border of light of long wave length and slow vibration and arranging outside of said border a border of light of short wave length and fast vibration to produce operation of the ocular muscles.

4. A method of producing reactionary color tone in a projected picture consisting in surrounding the picture area with a border of spectrally pure light refrangibly differing from the light of the picture.

THOMAS HENRY MARTEN.